United States Patent [19]

Oley et al.

[11] 4,181,154
[45] Jan. 1, 1980

[54] DEFLECTOR VALVE FOR FLUIDS

[75] Inventors: Leonard Oley, Hunlock Creek; Joseph Stachnik, Moscow, both of Pa.

[73] Assignee: ARA Services, Inc., Philadelphia, Pa.

[21] Appl. No.: 881,707

[22] Filed: Feb. 27, 1978

[51] Int. Cl.² ............................................. F16K 11/14
[52] U.S. Cl. ..................................... 137/863; 137/870; 137/871
[58] Field of Search ................. 137/625.5, 863, 870, 137/871, 872

[56] References Cited

U.S. PATENT DOCUMENTS

| | | | |
|---|---|---|---|
| 2,414,196 | 1/1947 | Geldhof et al. | 137/863 |
| 3,073,341 | 1/1963 | Schernekau | 137/863 |
| 3,823,556 | 7/1974 | Goto et al. | 137/625.5 X |
| 3,868,969 | 3/1975 | Schwenk | 137/625.5 |
| 3,991,788 | 11/1976 | Kull | 137/863 |
| 4,046,159 | 9/1977 | Pegourie | 137/625.66 X |

FOREIGN PATENT DOCUMENTS 1592746  6/1970  France ................................. 137/625.5

Primary Examiner—Gerald A. Michalsky
Attorney, Agent, or Firm—Paul & Paul

[57] ABSTRACT

A deflector valve for fluids directs fluid flow from an inlet port into either of two outlet ports. Deflection of the fluid into the desired outlet port is controlled by piston means which typically are operated by a solenoid. A unique operating pin, shaped like an hourglass, provides mechanical engagement between the piston means, and also facilitates the flow of fluid in the desired direction. The piston means are spring-biased, so that the valve selects one of the outlet ports in the de-energized state. The other outlet port is selected when the piston means encounter an external force opposing the spring.

3 Claims, 6 Drawing Figures

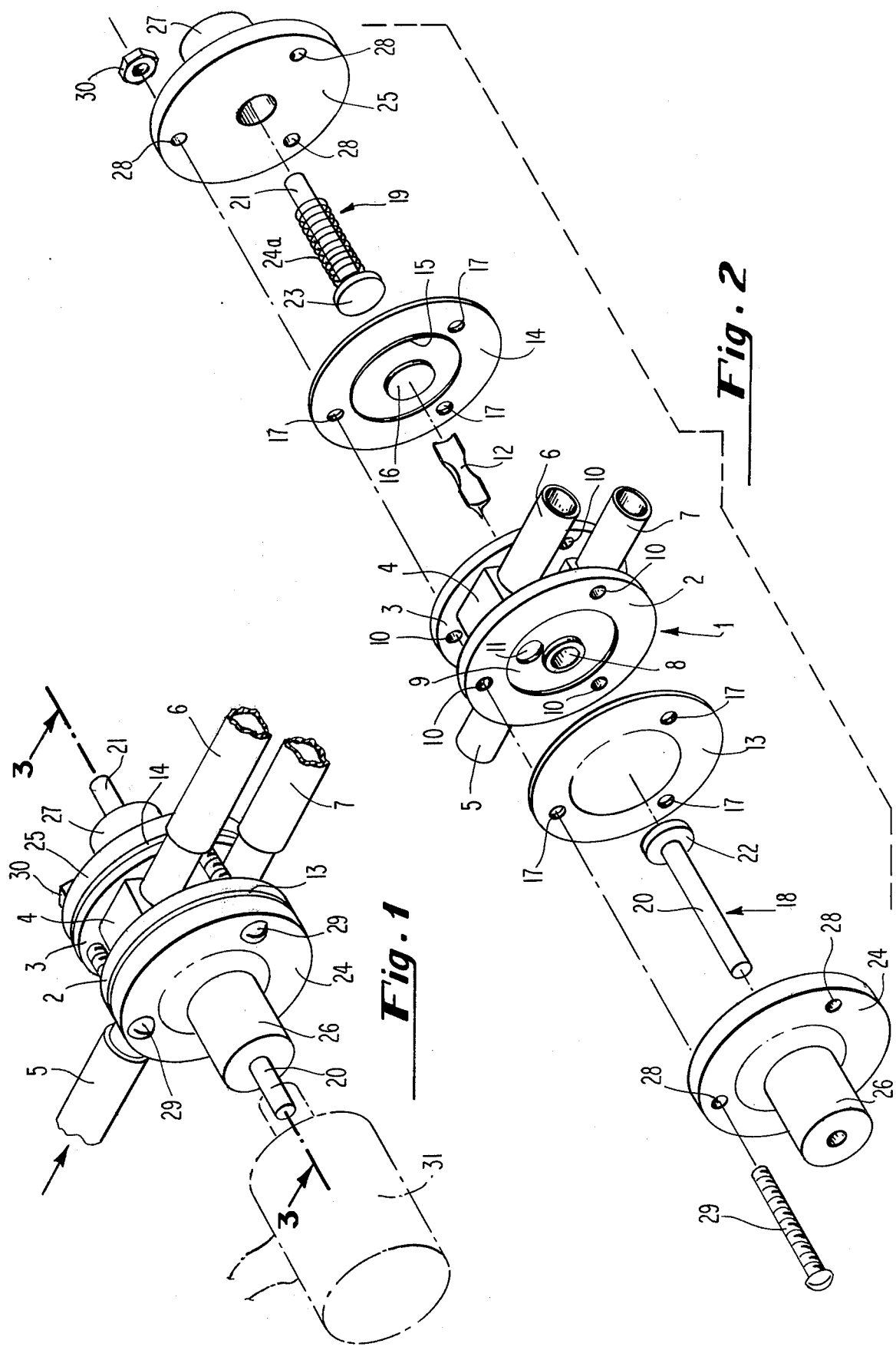

DEFLECTOR VALVE FOR FLUIDS

BACKGROUND OF THE INVENTION

This invention discloses a valve which allows the channeling of fluid from one source into either of two output lines. Deflector valves have been known in the past, but the particular structure of the valve disclosed herein, and especially the structure of the special operating pin at the center of the valve, constitutes a new and useful improvement over conventional valves.

One of the many applications of deflector valves occurs in the design of automatic beverage vending machines. Such machines typically vend several different types of hot drinks, using the same source of hot water for all hot beverage selections. Therefore, it becomes necessary to pump hot water from a hot water tank into any of several compartments in which coffee, tea, chocolate, and the like, may be mixed. Since such machines are normally electrically operated, it is also desired that the channeling of such fluid flow also be accomplished electrically. It is required that, upon the pressing of a selector button, a solenoid be energized which causes fluid flow through a deflector valve to occur through the proper channels.

One problem with conventional valves is that the same mechanism which permits the electrical control of such valves also tends to impede unduly the flow of fluid through the valve. This problem becomes important in the context of an automatic beverage vending machine, where vending is accomplished according to a pre-set time period. That is, a pump delivering water to a cup is set to operate for a predetermined period, and the actual volume of fluid flow into the cup is not measured. Thus it is important that the fluid pass freely through the valve so that the beverage cup be filled to the precise level required. All valves used in such a system must therefore respond immediately to fluid flowing into the inlet port so that the proper amount of beverage is delivered. Such valves must nevertheless retain their sturdy construction, and must resist the tendency to leak.

SUMMARY OF THE INVENTION

A valve which solves the problems discussed above is disclosed in the present invention. This valve comprises a housing in which one inlet port and two outlet ports are embedded. The inlet port communicates with a central transverse bore which extends through the width of the housing, and the outlet ports communicate with partial bores which extend approximately half of the distance through the thickness of the housing, each of said partial bores having openings on either side of the housing. Firmly held against the housing, and covering all openings created by said bores, are a pair of rubber diaphragms. Piston means are mounted on either side of the diaphragms, outside the valve housing, and are configured in substantially a straight line with the central transverse bore. Within the central transverse bore lies a special operating pin which engages both piston means, allowing the piston means alternately to extend or release either of the diaphragms. Fluid can flow easily around the operating pin by virtue of the unique construction of the pin. Fluid flowing past the pin then enters the cavity formed by the open diaphragm, and flows into the outlet port which has been selected by the external piston means.

It is therefore a primary object of this invention to provide a deflector valve for fluid which permits fluid flow into one inlet port to be channeled easily into either of two outlet ports.

It is a further object of this invention to provide a deflector valve which can be operated by a solenoid which is energized by a control switch.

It is a further object of this invention to provide a deflector valve which does not unduly impede the flow of fluid through such valve.

It is a further object of this invention to provide a deflector valve having a special operating pin in its center bore which facilitates the flow of fluid through said valve.

It is a further object of this invention to provide a spring-biased deflector valve for fluids which can be used in a practical automatic beverage vending machine.

It is a further object of this invention to provide a deflector valve which, when connected in series with other deflector valves, permits the channeling of fluid from one input line into three or more output lines.

It is a further object of the present invention to provide a deflector valve comprising a pair of flexible diaphragms which define channels for the flow of fluid through the valve.

It is a further object of this invention to provide a deflector valve as described above, wherein said diaphragms also serve to seal off that fluid path which is not the desired path for fluid flow.

Other objects of the present invention will be apparent to those skilled in the art from a reading of the following brief description of the drawings, the detailed description of the invention, and the appended claims.

BRIEF DESCRIPTION OF THE DRAWINGS

FIG. 1 is a perspective view of the deflector valve described in the present invention, shown partially in fragmentary form, and showing also, in dotted outline, a perspective view of a solenoid which might be used to activate the deflector valve.

FIG. 2 is an exploded perspective view of the deflector valve shown in FIG. 1.

DETAILED DESCRIPTION OF THE INVENTION

Figure 3:
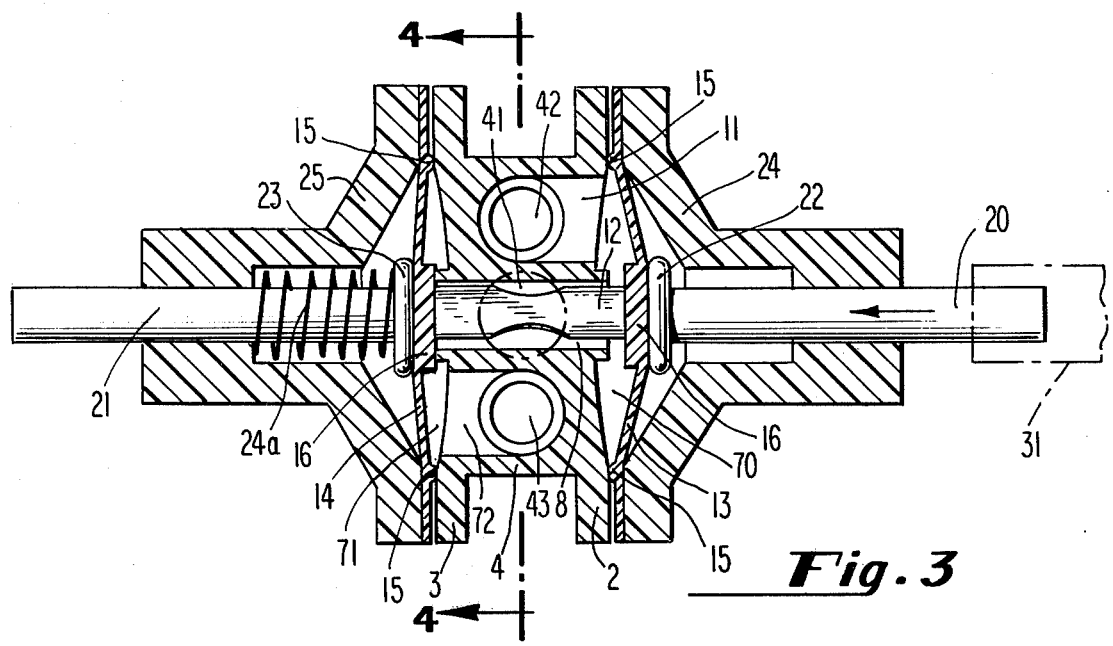
FIG. 3 is a cross-sectional view of the deflector valve, taken along the line 3—3 of FIG. 1.

The structure of the deflector valve disclosed in the present invention is illustrated in the exploded perspective view of FIG. 2. Housing 1 comprises a pair of disc members 2 and 3 integrally attached to a center portion 4. Inlet port 5 and outlet ports 6 and 7 are embedded in center portion 4. Central transverse bore 8 extends through the entire housing 1. Outlet ports 6 and 7 are attached to bores in center portion 4, which bores do not similarly extend entirely through the housing 1. Disc member 2 is provided with a recessed area 9 which facilitates formation of a watertight chamber for fluid flow, to be described below. Disc member 3 contains a similar recessed area. Disc members 2 and 3 contain holes 10 to facilitate the mounting of other components of the valve. A partial bore 11 extends about half way through the thickness of housing 1 and communicates with the bore into which outlet port 6 is mounted. A second partial bore, similar to partial bore 11, has an opening on the side of housing 1 which is not visible in FIG. 2, and which in like manner communicates with outlet port 7. As shown in FIG. 2, this second partial bore is located below, instead of above, the central transverse bore 8.

Operating pin 12 fits within the cylindrical space formed by central transverse bore 8. Diaphragms 13 and 14, which typically can be made of a flexible material such as rubber, fit over the disc members 2 and 3, respectively. As can be seen in the case of diaphragm 14, the diaphragms have a protruding rim 15 and a center plug 16 which correspond with the configuration of the outside of disc members 2 and 3. Holes 17 facilitate attachment of diaphragm 13 and 14 to housing 1. Piston means 18 and 19, having respectively shank portions 20 and 21 and head portions 22 and 23 are inserted into piston guides 24 and 25. Note that piston means 19 further comprises a spring 24a. Piston guides 24 and 25 have cylindrical members 26 and 27 which receive the piston means. Holes 28 are provided in the piston guide for attachment of the entire assembly. Attachment is accomplished by screws such as 29 and nut 30. It can be seen from FIG. 2 that piston means 18 and 19 are adapted to push against each other, along the same straight line, and that operating pin 12 transmits force from one piston means to the other.

The assembled deflector valve is shown in FIG. 1. Still visible are inlet port 5 and outlet ports 6 and 7. Disc members 2 and 3 can be seen, along with center portion 4. Diaphragms 13 and 14 can be seen sandwiched between the disc members 2 and 3 and piston guides 24 and 25. The shanks 20 and 21 of the piston means are seen extending from the cylindrical portions 26 and 27 of the piston guides. Screws 29 and nut 30 are also shown. FIG. 1 also shows, in dotted outline, solenoid 31 which is used to move piston means 20, and thereby to move piston means 21 as well, into another position. When current flows through solenoid 31, fluid can flow through one path, and when current flows through solenoid 31, fluid can flow only through the other path, as will be described below.

The internal structure of the deflector valve disclosed in the present invention is best explained with reference to the cross-sectional view of FIG. 3. In this figure, there are shown disc members 2 and 3 integrally connected to center portion 4. Diaphragms 13 and 14 are shown connected between disc members 2 and 3 respectively, and between piston guides 24 and 25 respectively. Protruding rims 15 and center plugs 16 are visible on diaphragms 13 and 14. Piston shanks 20 and 21 are shown, along with spring 24a and shank 21. Piston heads 22 and 23 are seen to press against the center portion of diaphragms 13 and 14, and engage the operating pin 12 which lies in central transverse bore 8. Bore 41 is adapted to receive the inlet port, and bores 42 and 43 are adapted to receive outlet ports 6 and 7, respectively of FIG. 1. Bores 42 and 43 communicate with partial bores 11 and 72, respectively.

Figure 4:
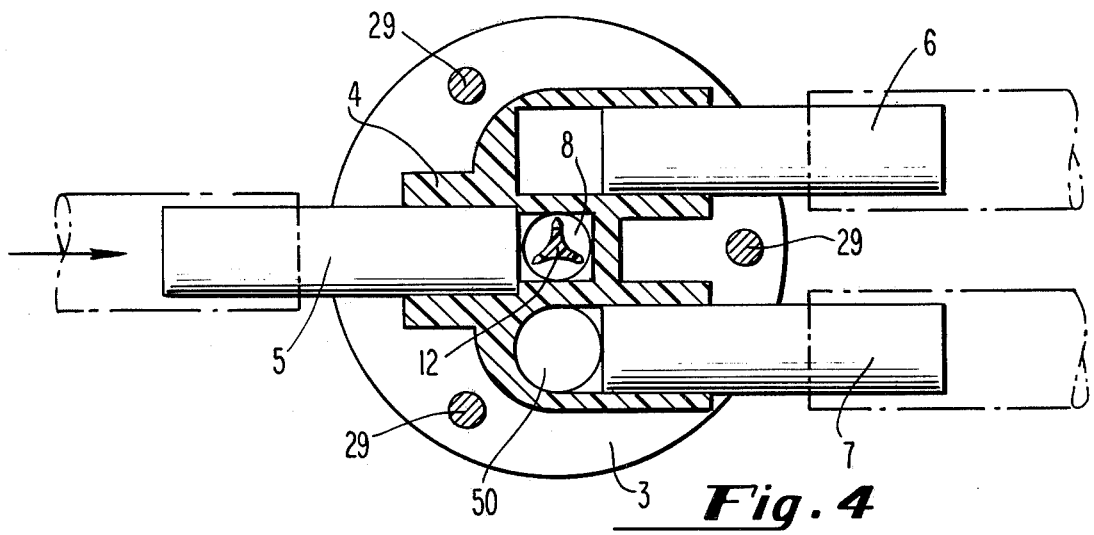
FIG. 4 is a cross-sectional view of the deflector valve, in partial fragmentary form, taken along the line 4—4 of FIG. 3.

The internal structure of the deflector valve is further illustrated in FIG. 4. In this figure, disc member 3 is shown, and the shape of center portion 4, attached to the disc member, is more clearly illustrated. Inlet port 5 and outlet ports 6 and 7 are shown. Partial bore 50 permits fluid to communicate with outlet port 7 and the outer portion of disc member 3. The corresponding partial bore, which connects to outlet port 6, and which is indicated by reference numeral 11 in FIG. 2, is not visible in the cross-sectional view of FIG. 4. Central transverse bore 8 is clearly shown, as it communicates with inlet port 5. Also shown is operating pin 12 which lies within central transverse bore 8. Screws 29 are also visible in cross-section.

Figure 5:
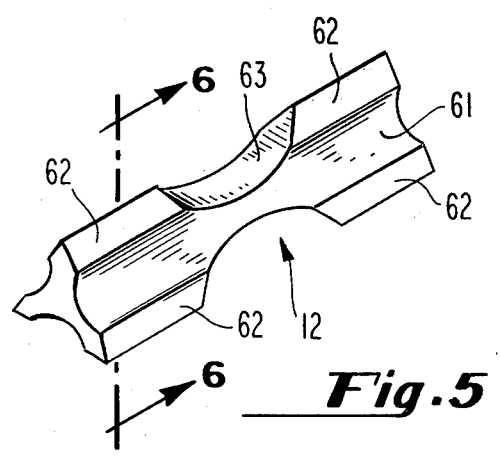
FIG. 5 is a perspective view of the operating pin which is located at the center of the deflector valve.

The structure of operating pin 12 is more clearly shown in the perspective view of FIG. 5. In the embodiment shown herein, the operating pin 12 can best be described as a prismatic solid, originally having a cross section in the shape of an equilateral triangle, which has been routed longitudinally along its three sides, and also in a direction perpendicular to the longitudinal routing. In FIG. 5, the longitudinally routed portion is indicated as 61, and the non-routed remainders of the sides of the operating pin are indicated as 62. Routing in the direction perpendicular to the longitudinal routing is indicated as 63.

Figure 6:
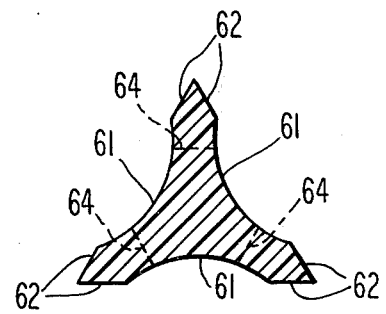
FIG. 6 is a cross-sectional view of the operating pin, taken along the line 6—6 of FIG. 5.

The structure of operating pin 12 is further illustrated in the cross-sectional view of FIG. 6. Routed sections 61 are plainly shown along with non-routed portions 62. The routing in the perpendicular direction is indicated by dotted lines 64.

The operation of the deflector valve described herein can best be explained with reference to FIG. 3. When no current flows through solenoid 31, there is no external force being applied to piston shank 20. Therefore, the force exerted by spring 24a causes piston head 23 to push against diaphragm 14, so that center plug 16 effectively seals off the central transverse bore 8 to fluid flow. At the same time, piston head 23 pushes operating pin 12 to the right, as shown in the figure, and causes diaphragm 13 to be extended away from disc member 2. Center plug 16 of diaphragm 13 is now pushed away from central transverse bore 8, allowing fluid to flow into the cavity 70 defined by disc member 2 and diaphragm 13. By virtue of the size of operating pin 12, and the routed portion 63, as shown in FIG. 5, fluid may flow from the inlet port into central transverse bore 8. Furthermore, by virtue of routed portion 61 of operating pin 12, fluid may flow in a sideward direction, as seen in FIG. 4, out of central transverse bore 8 and into cavity 70. But because bore 42 connects with partial bore 11 which opens into cavity 70, fluid may flow through cavity 70 and into bore 42, and thereby through outlet port 6.

When current flows through solenoid 31, piston shank 20 pushes in a direction opposing the force of spring 24a, and overcomes force of the spring. Piston head 22 therefore presses against center plug 16 of diaphragm 13, closing off the flow of fluid from central transverse bore 8 into cavity 70. At the same time, operating pin 12 pushes diaphragm 14 away from disc member 3, thus enlarging cavity 71 in a manner similar to what was done to cavity 70. Because bore 43 has an opening into cavity 71, through partial bore 72, fluid can flow from the inlet port into outlet port 7 when solenoid 31 is energized.

It is seen that operating pin 12 performs the necessary function of transmitting force from one piston to the other. But the unique construction of operating pin 12 also facilitates the flow of fluid in various directions through central transverse bore 8. In particular, the routed portions of operating pin 12 provide convenient paths for fluid flow, while at the same time retaining the rigidity of the operating pin necessary to transmit forces from one piston to the other. Water flowing into the inlet port is therefore not hindered as it tries to flow into the appropriate cavity and through the desired outlet port. Water that enters the inlet port will exit the appropriate outlet port without any appreciable delay time.

It is apparent from the foregoing description that the objects of the present invention have been amply fulfilled. It is understood that many modifications of the deflector valve shown herein are possible. Variation in the materials used, as well as in various structural details are possible, all within the spirit and scope of this invention.

What is claimed is:

1. A deflector valve for fluid comprising:
   a housing defining a central transverse bore through the entire thickness of said housing, said housing further defining a first partial bore extending through less than the thickness of said housing, and a second partial bore extending through less than the thickness of said housing, said first and second partial bores having openings on opposite sides of said housing;
   an inlet port connected to said housing and communicating with said central transverse bore;
   first and second outlet ports connected to said housing and communicating respectively with said first and second partial bores;
   a pair of diaphragms attached to the sides of said housing, said diaphragms being of sufficient size to cover the openings created by said central transverse bore and said partial bores;
   means for alternately extending either of said diaphragms away from said housing, wherein either of said diaphragms when extended completes a path for fluid flow from said inlet port to one of said outlet ports;
   spring means for holding one of said diaphragms in an extended position relative to said housing;
   wherein said diaphragm extending means comprises a pair of piston means, said piston means being positioned to push on said respective diaphragms from outside said housing, and an operating pin located in said central transverse bore, said operating pin being of sufficient length to experience force simultaneously from both of said piston means;
   wherein one of said piston means is spring-biased, and wherein said piston means and said operating pin are configured substantially along a straight line, and wherein the force exerted by said spring-biased piston means against one of said diaphragms tends to block fluid flow from said central transverse bore, and wherein the force exerted by said diaphragm and said operating pin tends to extend said other diaphragm and to permit fluid flow from said central transverse bore into one of said partial bores;
   further comprising a pair of piston guides, said guides defining cavities permitting slidable movement therein of said piston means, wherein said guides abut said diaphragms and are attached to said housing, wherein said diaphragms are firmly held between said housing and said piston guides, and wherein the attachment forms two watertight enclosures defined by said housing in both of said diaphragms;
   wherein said member has at least one transverse recess and at least one longitudinal recess, said longitudinal recess extending throughout the length of said member.

2. The valve of claim 1, wherein said member has three longitudinal recesses, and wherein said member has three transverse recesses, and wherein said member comprises a routed prismatic solid.

3. The valve of claim 2, wherein said member substantially fills the space defined by said central transverse bore, and wherein said member fits loosely within said central transverse bore.

* * * * *